May 28, 1963 J. C. BROWN ETAL 3,091,506

DATA RECORDER

Filed June 13, 1960 2 Sheets-Sheet 1

INVENTORS
JAMES C. BROWN
LLOYD M. BOUTWELL
BY Gravely, Lieder & Woodruff
ATTORNEYS INVENTORS
JAMES C. BROWN
LLOYD M. BOUTWELL
BY Gravely, Lieder & Woodruff
ATTORNEYS United States Patent Office 3,091,506

Patented May 28, 1963

3,091,506

DATA RECORDER

James C. Brown, Lancaster, Calif., and Lloyd M. Boutwell, Kirkwood, Mo., assignors to McDonnell Aircraft Corporation, St. Louis County, Mo., a corporation of Maryland Filed June 13, 1960, Ser. No. 49,115

8 Claims. (Cl. 346—107)

The present invention relates to recording devices in general and more particularly to a device for recording data in the form of brightness impulses.

Many devices have been constructed in the past for recording data and some of the known devices use photographic principles and light producing means in association therewith. However, the known devices have been relatively expensive to construct and use, and they have been cumbersome, complicated and slow acting, and for these and other reasons have been unsatisfactory.

The present device overcomes these and other disadvantages of the known devices by providing relatively simple, inexpensive, yet versatile and fast acting means for recording information. Briefly, the present device comprises a photosensitive recording medium or film (film housing with film means positioned therein), means for illuminating preselected portions of said film means to form meaningful images thereon, said last named means including a plurality of light producing elements mounted adjacent to said film, means shielding the light producing elements from each other, said shielding means having an opening therein associated with each of said light producing elements and located between said light producing elements and the film, and circuit means connecting each of said light producing elements to an external control circuit for the energization thereof. The present device also includes means for partially pre-energizing said light producing elements.

It is a principal object of the present invention to provide unique and simple means for recording information.

Another object is to provide high speed means for recording information.

Another object is to provide relatively inexpensive, flexible, and rugged means for recording information.

Another object is to provide means for making a permanent record of actual or simulated performance characteristics.

It is a further object to provide means of the foregoing character which are adaptable to the training of personnel in special activities where a large number of detailed reactions need to be recorded for later study to improve accuracy and speed of reaction, or where the differences between correct and incorrect activity needs to be recorded for later study, all without endangering human life or unnecessarily expending material.

These and other objects and advantages of the present invention will become apparent after considering the following detailed description of one embodiment thereof in conjunction with the accompanying drawing, wherein.

Figure 1:
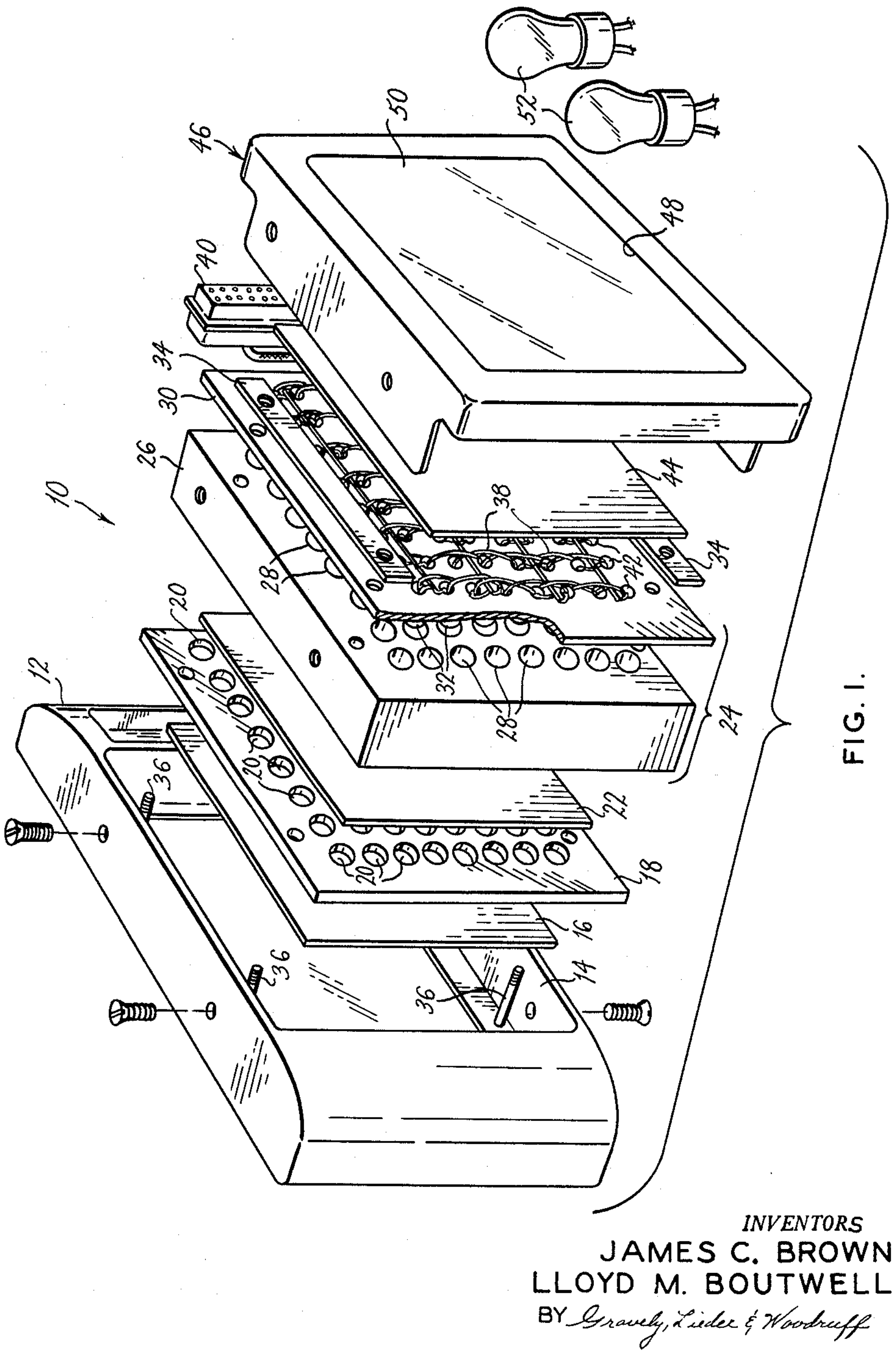
FIG. 1 is an exploded view of a recording device constructed according to the present invention.

Referring to the drawings more particularly by reference numbers, the number 10 refers generally to a data recording device constructed according to the present invention. The device 10 has a housing 12 open on one side at 14. A photosensitive medium such as a film negative 16 is positioned in the housing opening 14, and a spacer plate 18 is positioned adjacent to the negative 16.

The plate 18 has a plurality of spaced apertures or openings 20 therethrough which for illustrative purposes are shown arranged in perpendicular rows and columns. The openings 20 can be made in any desired shape, such as in the shapes of the numbers shown in the picture illustrated in FIG. 3.

A red filter member 22 is positioned adjacent to the plate 18, and a lamp bank assembly 24 is positioned on the opposite side thereof from said plate 18. The lamp bank assembly 24 includes a lamp block 26 which has a plurality of tubular passages 28 arranged in perpendicular rows and columns therethrough. The passages 28 are in alignment with the corresponding apertures 20 in the plate 18 when the device 10 is assembled. The assembly 24 also includes a lamp mounting member 30 which has a plurality of lamps 32 mounted on one side thereof. The lamps 32 can be incandescent lamps, neon lamps or any other suitable type of lamp, and the lamps 32 are arranged on the mounting member 30 in perpendicular rows and columns so that they can be positioned in corresponding ones of the passages 28. Means such as bars 34, threaded members 36, and suitable holes in the members are also provided for fastening the members of the device 10 together.

The lamps 32 are preferably selected to be neon or similar gas filled bulbs, and are connected by suitable leads 38 to an electric plug receptacle 40. The receptacle 40 is plugged into another receptacle (not shown) and completes circuits to external control means which provide impulses under certain conditions for energizing the bulbs 32. The external control means form no part of the present invention nor is it intended to limit the present device to a specific use.

Openings 42 are made in the lamp mounting member 30 behind each neon bulb 32 to accommodate the leads for the bulbs and also to provide means for the passage of light therethrough to the bulbs for reasons which will be explained hereinafter. It should also be noted that one side of each neon bulb can be grounded to reduce the amount of wiring required. This is one reason for selecting neon bulbs over filament bulbs which produce feed back circuits, and therefore need two instead of one wire per bulb. Also, neon bulbs are not as subject as filament bulbs to damage caused by shock and vibration and they also can be more easily constructed having smaller physical dimensions.

Figure 2:
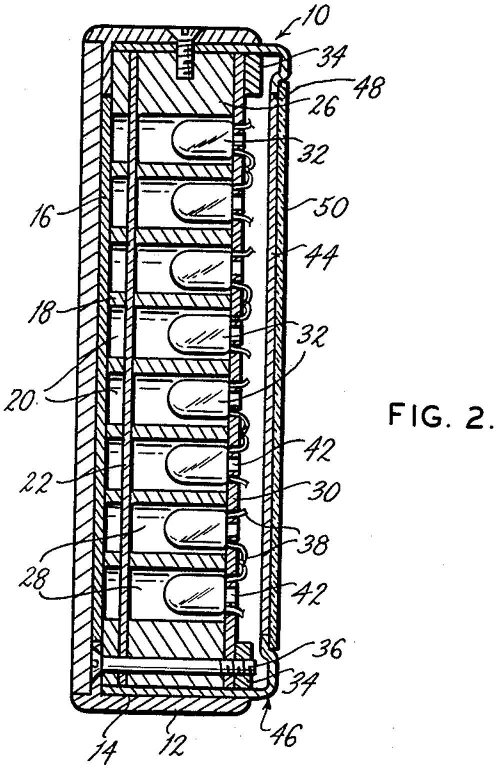
FIG. 2 is an enlarged cross-section elevational view through the center of the same device in assembled condition.

A green filter 44 is positioned adjacent to the mounting member 30 on the side thereof associated with the leads 38, and a cover 46 is provided to complete the device 10. The cover 46 has an opening 48 on one side which is closed by a transluscent or transparent filter 50. An electric light source such as the two independently energized incandescent bulbs 52 are positioned adjacent to the filter 50 as shown in FIG. 1, and it is understood that similar bulbs would also be positioned to the right of FIG. 2. Two instead of one bulb 52 is provided in case one becomes damaged.

The light bulbs 52 are energized at all times during operation of the device 10 and the light therefrom passes through the filter 50, the green filter 44, the openings 42 in the lamp mounting member 30, and onto the neon bulbs 32. This is done to partially ionize the neon gas in the bulbs 32 and to assure that they will light when energized by their associated control circuits. This has been found desirable because neon and other types of gas filled bulbs are unreliable if they are not provided with some pre-energization, and their reliability is the poorest when they are in a completely lightless surrounding. This condition is overcome by exposing them to the light from the bulbs 52 as described.

It is not desirable, however, to have the light from the bulbs 52 pass through the passages 28 in the block 26 and onto the film negative 16. Therefore, the red filter 22 is interposed between the block 26 and the film. The combination of the filtering action of both the red and the green filters 44 and 22 prevents any light from the bulbs 52 reaching the film 16. However, since only the red filter 22 and the perforated plate 18 are between the bulbs 32 and the film 16, the light from the bulbs 32 can and does reach the film whenever the bulbs are energized and in this way images are produced.

Obviously other types of bulbs can also be used in the present device depending on the operating conditions, the space limitations, and the use being made of the device. However, as pointed out above there are advantages in using neon bulbs in cases where space is limited, and in situations where the device is going to be subjected to severe shock and vibration. There are also cost and construction considerations involved in the selection of parts and components.

A typical application for the present device is as means for making a record of operation, actual or simulated, of a device such as a rocket or missile. In such an application the present device is used to make a photographic record of the operation of the various control circuits from which it can be determined how the missile performed and the likelihood that it landed on target. In the past the testing of the controls required actual launching of the missile or rocket and for this reason was relatively expensive and still did not provide a permanent record.

The present device, on the other hand, provides economical means for making simulated tests of performance of the controls, even without launching the missile and saves many man hours of trouble shooting and repairing. This is so because the correct or faulty operation of the controls are recorded on the film during a simulated or test run or test bombing mission without actually expending a missile.

The form of the impulses used to energize the bulbs 32 as well as the circuits which generate the impulses are not part of the present invention. Furthermore, the size and shapes of the light spots formed on the film by the bulbs can be varied depending on the characteristics of the device being tested, and still further any suitable number and arrangement of the bulbs 32 can be used depending upon the type and amount of information being taken. In the case of a simulated missile firing, it may also be desirable to make provision for making more than one test firing of the missile using the same film.

It is also intended to provide latitude in the film housing to accommodate different kinds of film, and the invention is not intended to be limited to any particular film type.

Figure 3:
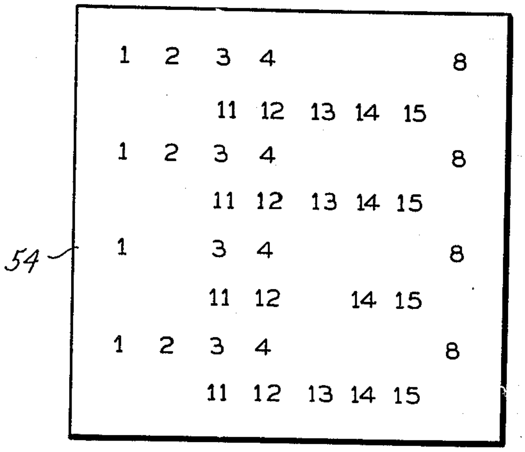
FIG. 3 is an enlarged plane view of a typical photograph made by the present device.

In FIG. 3 is shown an enlarged view of a picture 54 made from a negative exposed to light from certain of the bulbs 32. The picture includes a plurality of different numbers to correspond to certain bulb positions, and each of the four sets of numbers shown corresponds to a different simulated test of the device being tested. In the illustration, the device being tested operated correctly for the first, second and fourth tests, but not for the third test where the bulbs in positions 2 and 13 failed to light. The failure of these bulbs to light indicates a particular malfunction. Obviously, the bulbs can be made to indicate either a proper or an improper operating condition depending on the circuit connected thereto.

It is now apparent that there has been shown and described novel means for recording data during a simulated or actual operation of a device or circuit being tested, comprising a film housing, a film negative in said housing, a block member positioned adjacent to the film negative and having a plurality of passages therethrough with one end of each of said passages communicating optically with the negative, a device in each of said passages which produces light when energized, and a control circuit connected to each of said light producing devices for energizing the associated devices on occurrence of a predetermined condition. The device also includes means for preenergizing the light producing devices to improve their reliability.

Many changes, variations, modifications, and adaptations of the present invention will become apparent to those skilled in the art after considering this specification in conjunction with the accompanying drawing. All such changes, variations, modifications and adaptations which do not depart from the spirit and scope of the invention are deemed to be covered by the invention which is limited only by the claims which follow.

What is claimed is:

1. A recorder device comprising a film housing, a film positioned in the housing, a first colored filter positioned adjacent to said film, means for producing illumination images in preselected areas of the film, said last named means including a mounting member positioned adjacent to the first colored filter and having a plurality of holes extending therethrough in optical communication with different preselected areas of the film through said filter, a gas filled bulb capable of producing light when energized positioned in each of said holes, individual signal generating means connected to each of said bulbs and capable of energizing said associated bulbs to produce light in response to a preselected external electrical condition, a second colored filter positioned adjacent to the mounting member on the opposite side thereof from the film and in optical communication with the gas filled bulbs in the holes, and means for partially ionizing the gas in the bulbs including a light source positioned adjacent to said second filter, said light source being positioned to produce illumination in said holes and to thereby partially ionize the gas in the gas filled bulbs, said first colored filter having a different color than the second colored filter.

2. The recorder device defined in claim 1 wherein the colors of the first and second colored filters are selected so that their combined optical effect substantially prevents passage of light therethrough.

3. The recorder device defined in claim 1 wherein one of said colored filters is red and the other is green.

4. The recorder device defined in claim 1 wherein said gas filled bulbs are neon bulbs.

5. In combination, a plurality of circuits capable of generating impulses in response to preselected operating conditions thereof, and a photographic recording device for making a record of the operation performance of said circuits, said recording device including a housing, a photosensitive member positioned in the housing, a mounting member positioned adjacent to said photosensitive member and having a plurality of holes extending therethrough in optical communication with different preselected areas of the photosensitive member, a gas filled element capable of producing light when energized by impulses from preselected ones of said circuits positioned in each of said holes, means connecting each of said gas filled elements to a different one of said plurality of circuits whereby said elements will be energized to produce light in response to impulses generated by the associated circuits to thereby produce images on the associated areas of the photosensitive member, means for conditioning the gas filled elements to increase the reliability of their operation including a light source and means optically communicating said source with each of said gas filled elements, and other means to prevent said light source from communicating with the photosensitive member.

6. The combination set forth in claim 5 wherein said means preventing the light source from communicating with the photosensitive member includes a first colored filter positioned between the light source and the gas filled elements, and a second colored filter of a different color positioned between the gas filled elements and the photosensitive member.

7. Data recording means for recording selected performance characteristics of a plurality of operating units comprising means for producing individual signals in response to performance of preselected individual operating conditions of said units, and means for recording the performance or non-performance of said conditions, said last named means including a housing having a photosensitive member positioned therein, a plurality of gas filled bulbs positioned adjacent to said photosensitive member, means optically isolated each of said gas filled bulbs from the other gas filled bulbs and for communicating each bulb with a different preselected portion of the photosensitive member, means connecting each of said gas filled bulbs to a different signal producing means, each of said signal producing means being capable of energizing the associated gas filled bulb in response to preselected operating conditions thereof whereby said bulbs illuminate the associated portions of the photosensitive means, and means for conditioning said gas filled bulbs to improve their operational reliability by partially ionizing the gas contained therein, said last named means including a light source, means for communicating said light source with said gas filled bulbs, and means for preventing said light source from communicating with said photosensitive member.

8. A data recorder for recording the operation or failure of a plurality of individual operating units comprising a housing having a photosensitive member positioned therein, a first colored filter positioned adjacent to the photosensitive member, a cellular member positioned adjacent to said first filter, said cellular member having a plurality of holes therethrough that optically communicate with different preselected areas of the photosensitive member, a gas filled light producing element positioned in a plurality of holes, means connecting each of said gas filled light producing elements to a different preselected operating unit the performance of which is to be recorded, a second filter of a different color than the aforementioned filter positioned adjacent to the cellular unit on the opposite side thereof from the aforementioned filter, and a light source positioned adjacent to said second filter for illuminating the holes of the cellular member to partially ionize the gas in the gas filled light producing elements, the color combination of said first and second filters preventing the passage of light from the light source from reaching the photosensitive member.

References Cited in the file of this patent

UNITED STATES PATENTS

| | | |
|---|---|---|
| 1,760,159 | Mathes | May 27, 1930 |
| 1,907,124 | Ruben | May 2, 1933 |
| 2,072,455 | Kannenberg | Mar. 2, 1937 |
| 2,322,602 | Terry | June 22, 1943 |
| 2,392,890 | Vincent et al. | Jan. 15, 1946 |
| 2,590,110 | Lippel | Mar. 25, 1952 |